(12) United States Patent
Silva De Vasconcelos et al.

(10) Patent No.: US 12,416,375 B2
(45) Date of Patent: Sep. 16, 2025

(54) END-PIECE OF A FLEXIBLE PIPE FOR TRANSPORTING FLUID, ASSOCIATED FLEXIBLE PIPE AND METHOD

(71) Applicant: TechnipFMC Subsea France, Courbevoie (FR)

(72) Inventors: Juliana Silva De Vasconcelos, Rouen (FR); Phellip Frigeri, Rio de Janeiro (BR); Benjamin Senneville, Bois Guillaume (FR); Benoît Riff, Melamare (FR)

(73) Assignee: TechnipFMC Subsea France (FR)

( * ) Notice: Subject to any disclaimer, the term of this patent is extended or adjusted under 35 U.S.C. 154(b) by 0 days.

(21) Appl. No.: 18/705,524

(22) PCT Filed: Oct. 27, 2022

(86) PCT No.: PCT/EP2022/080119
§ 371 (c)(1),
(2) Date: Apr. 27, 2024

(87) PCT Pub. No.: WO2023/073122
PCT Pub. Date: May 4, 2023

(65) Prior Publication Data
US 2025/0012388 A1    Jan. 9, 2025

(30) Foreign Application Priority Data

Oct. 29, 2021    (FR) ...................... 21 11543

(51) Int. Cl.
*F16L 33/01*    (2006.01)
*F16L 11/08*    (2006.01)
*F16L 33/00*    (2006.01)

(52) U.S. Cl.
CPC ............. *F16L 33/01* (2013.01); *F16L 11/083* (2013.01); *F16L 33/003* (2013.01)

(58) Field of Classification Search
CPC ........ F16L 33/01; F16L 11/083; F16L 33/003; F16L 33/222; F16L 33/28
(Continued)

(56) References Cited

U.S. PATENT DOCUMENTS

| 2,167,258 A | * | 7/1939 | Wilson | ...................... F16L 33/18 |
| | | | | 285/259 |
| 2,931,671 A | * | 4/1960 | Beeley | .................. F16L 21/035 |
| | | | | 285/341 |

(Continued)

FOREIGN PATENT DOCUMENTS

| EP | 3040593 A1 | 7/2016 |
| JP | 05231576 A | * 9/1993 ............... F16L 33/01 |

(Continued)

OTHER PUBLICATIONS

International Search Report mailed Jan. 17, 2023 in corresponding PCT International Application No. PCT/EP2022/080119.

(Continued)

*Primary Examiner* — David Bochna
(74) *Attorney, Agent, or Firm* — OSTROLENK FABER LLP (57) ABSTRACT

An end-fitting of a flexible pipe for transporting fluid, that includes at least one sealing assembly with at least one crimping ring comprising at least one bulge inserted radially into a polymer sheath of the flexible pipe,
the end-fitting including an annular seal, disposed in contact with the polymer sheath at a distance from the crimping ring,
the annular seal having an annular central region that is deformable radially towards the polymer sheath, and two stiffened annular peripheral regions that are situated on either side of the central region along a central axis of the flexible pipe, the peripheral annular regions being movable towards one other to activate radial (Continued)

deformation of the central region towards the polymer sheath from a rest configuration to an active sealing configuration around the polymer sheath.

19 Claims, 6 Drawing Sheets

(58) Field of Classification Search
USPC ....... 285/341, 339, 222.2, 222.4, 222.1, 255
See application file for complete search history.

(56) References Cited

U.S. PATENT DOCUMENTS

| | | | | |
|---|---|---|---|---|
| 4,549,581 | A * | 10/1985 | Unno | F16L 11/083 138/132 |
| 6,923,477 | B2 * | 8/2005 | Buon | F16L 11/083 138/109 |
| 8,104,797 | B2 * | 1/2012 | Eccleston | F16L 33/01 285/222.4 |
| 2004/0036280 | A1 * | 2/2004 | Belcher | F16L 21/04 285/222.2 |
| 2004/0066035 | A1 | 4/2004 | Buon et al. | |
| 2015/0330890 | A1 * | 11/2015 | Clevelario | F16L 33/16 285/96 |
| 2016/0208969 | A1 * | 7/2016 | Bertoni | F16L 23/024 |
| 2016/0290539 | A1 * | 10/2016 | Nielsen | G01D 5/353 |
| 2019/0003921 | A1 * | 1/2019 | Nicolas | G01M 5/0025 |

FOREIGN PATENT DOCUMENTS

| | | |
|---|---|---|
| WO | WO 2004-001269 A1 | 12/2003 |
| WO | WO 2014-001236 A1 | 1/2014 |
| WO | WO 2014-001237 A1 | 1/2014 |
| WO | WO 2014-174244 A1 | 10/2014 |
| WO | WO 2017-037541 A1 | 3/2017 |
| WO | WO 2019-105926 A1 | 6/2019 |
| WO | WO 2019-137591 A1 | 7/2019 |

OTHER PUBLICATIONS

Search Report mailed May 30, 2022 in corresponding French Application No. FR 2111543.
"Designed to Perform under Extreme Pressure: Anti-extrusion Spring Seals", PPE Precision Polymer Engineering, Advanced sealing solutions for critical applications.
"Oil & Gas Sealing Systems, Product Catalog and Engineering Guide", Trelleborg Sealing Solutions. Jun. 2018.

* cited by examiner

END-PIECE OF A FLEXIBLE PIPE FOR TRANSPORTING FLUID, ASSOCIATED FLEXIBLE PIPE AND METHOD

CROSS-REFERENCE TO RELATED APPLICATIONS

The present application is a 35 U.S.C. §§ 371 national stage application of International Application No. PCT/EP2022/080119, filed Oct. 27, 2022, which claims priority to French Patent Application FR2111543, filed Oct. 29, 2021, the contents of which are incorporated herein by reference.

FIELD

The present invention relates to an end-fitting of flexible pipe for transporting fluid, including:
- at least one end region of a polymer sheath of the flexible pipe;
- end sections of armor elements of the flexible pipe arranged around or in the end region of the polymer sheath;
- an end vault defining a central bore for letting the fluid flow, extending along a central axis;
- a cover defining, along with the end vault, a chamber for receiving the end sections of armor elements;
- at least one sealing assembly comprising at least one crimping ring, the crimping ring comprising at least one bulge inserted radially into the polymer sheath;
- an annular seal, arranged in contact with the polymer sheath away from the crimping ring.

BACKGROUND

The pipe is more particularly an unbonded flexible pipe intended for transporting hydrocarbons through a body of water, such as an ocean, a sea, a lake or a river.

Such a flexible pipe is e.g. produced according to the normative documents API 17J, $4^{th}$ edition May 2014 and API RP 17B, $5^{th}$ edition—May 2014 established by the American Petroleum Institute.

The pipe is usually formed by a set of concentric and superimposed layers. The pipe is considered to be "unbonded" as defined by the present invention provided that at least one of the layers of the pipe is configured to move longitudinally with respect to the adjacent layers during a bending of the pipe. More particularly, an unbonded pipe is a pipe which has no bonding materials connecting the layers forming the pipe.

The pipe is generally arranged across a body of water, between a bottom unit intended for collecting the fluid extracted at the bottom of the body of water and a floating surface unit intended for collecting and distributing the fluid. The surface unit can be a semi-submersible platform, an FPSO or another floating unit.

In a known manner, the pipe includes a pressure sheath made of polymer, intended to contain the fluid transported by the pipe, an intermediate sheath, if appropriate, and an external sheath intended to protect the pipe externally.

The ends of the pipe have end-fittings for connection to the bottom unit and to the surface unit.

The end region of each sheath is received in an end-fitting of the pipe and is mounted in the end-fitting in so as to be sealed.

To this end, a known solution for making a sealed connection is to crimp a metal ring around the outer face of the sheath so that the ring partially penetrates into the thickness of the sheath wall.

The crimped ring is generally in the form of a hollow cone surrounding the sheath, the cone being arranged coaxially with the sheath. During the crimping, a conical bearing surface machined in the body of the end-fitting is thrust axially around the cone, the conical seat also being coaxial with the sheath to be crimped and with the cone.

During the thrust, the cone is compressed radially with respect to the axis of the sheath, the diameter thereof decreases and the cone deforms plastically by penetrating partially inside the sheath. The crimping operation simultaneously provides the metal/polymer seal between the cone and the sheath and the metal/metal seal between the cone and the body of the end-fitting.

Such solution withstands very high internal pressures (more than 1000 bar) within a wide temperature range (up to 130° C. and above). The solution is particularly effective when the pressure inside the sheath is greater than the pressure outside the sheath, because the difference in pressure tends to increase the diameter of the sheath. As a result, the contact pressure increases between the sheath and the crimping ring, and the pressure between the crimping ring and the body of the end-fitting increases as well, thus reinforcing the sealing of the assembly.

In the case of a pressure sheath, the internal pressure is usually much higher than the external pressure, which reinforces the tightness, but the pressure gradient can sometimes be reversed, e.g. during a production shutdown followed by a decompression.

When the pressure gradient is reversed, the opposite effect to the effect described hereinabove occurs. The contact pressures between the crimping ring and the sheath are reduced and the sealing of the assembly is decreased. In particular cases, micro-leaks can be generated therefrom.

In the case of the outer sheath, the problem is more critical because the pressure gradient is often reversed permanently, in particular when the end-fitting is immersed at great depth. In such case, the hydrostatic pressure applied against the outer face of the outer sheath is significantly higher than the pressure prevailing in the wall of the pipe which applies against the inner face of the outer sheath.

To overcome such problems, it is known, e.g. from WO2019/137591, to add a sealing ring in addition to the polymer crimped ring between the end-fitting vault and the sheath the sealing of which is to be achieved.

In certain cases, the annular seal may include an external radial reinforcement region located radially on the outside of an elastomer ring.

Such a solution is not entirely satisfactory. In certain circumstances, the contact pressure applied to the polymer sheath is not strong enough to maintain the sealing. Furthermore, the solution presented in the aforementioned document applies only to the pressure sheath and is not necessarily suited for intermediate sheaths or external sheaths that may be present within the flexible pipe.

SUMMARY

A goal of the invention is thus to provide an end-fitting of flexible pipe for transporting a fluid, wherein the sealing between a polymer sheath and the vault of the end-fitting is improved, whatever the differential pressure conditions applying to the pipe, and regardless of the type of sheath around which the seal is made in the end-fitting.

To this end, the subject matter of the invention is an end-fitting of flexible pipe for transporting a fluid of the aforementioned type, characterized in that the annular seal includes an annular central region deformable radially toward the polymer sheath, and two stiffened annular peripheral regions, located on both sides of the central region along the central axis, the peripheral annular regions being movable toward each other to activate radial deformation of the central region toward the polymer sheath from a rest configuration to an active sealing configuration around the polymer sheath.

The end-fitting according to the invention can comprise one or a plurality of the following features, taken individually or according to any technically possible combination:
- at least in the active position, the central region defines a radial tip protruding toward the polymer sheath beyond each peripheral annular region;
- in the rest configuration, the central region has the radial tip;
- the central region is made of elastomer, in particular a fluoroelastomer such as FKM, FFKM or FVMQ, or a nitrile elastomer such as NBR or HNBR, each peripheral region being made of metal, or of a polymer which is more rigid than the elastomer, in particular containing PEK, PEEK, PEEKK, PEKEKK, or containing a fluoropolymer, such as polyethylene tetrafluoride (PTFE);
- the end-fitting defines a housing for receiving the annular seal, the housing being delimited by a transverse activation surface of the annular seal, located on the end vault or on a part fastened with respect to the end vault, the transverse activation surface extending opposite the first peripheral region, the housing being also delimited by a transverse thrust surface of the annular seal, located opposite the transverse activation surface, on an additional compression activation part of the annular seal, the transverse thrust surface extending opposite the second peripheral region, the activation transverse surface and the thrust transverse surface being movable relative to each other at least during the fitting of the end-fitting, so as to switch the annular seal from the rest configuration thereof to the active configuration thereof;
- the additional part is fastened on the crimping ring;
- the end-fitting defines a pressure transmission channel external to the flexible pipe, opening out into the housing between the activation surface and the first peripheral region;
- the first peripheral region and/or the second peripheral region are assembled onto surfaces of the central region;
- the central region has a first surface inclined at a non-zero angle with respect to a plane perpendicular to the central axis, the first peripheral region having a first supplementary inclined surface directly mounted on the first inclined surface, the inclination of the first inclined surface being directed toward the second peripheral region when moving radially toward the central axis on the first inclined surface;
- the central region has a second inclined surface at a non-zero angle with respect to a plane perpendicular to the central axis, the second inclined surface being located opposite the first inclined surface along the central axis, the second peripheral region having a supplementary second inclined surface fastened to the second inclined surface, the central region advantageously having a trapezoidal cross-section;
- the first peripheral region and the second peripheral region each have a continuous or discontinuous annular member embedded in the material forming the central region;
- the end region of the sheath is an end region of a pressure sheath of the flexible pipe defining an internal passage for letting flow a fluid, an end region of an outer sheath of the flexible pipe defining an outer surface of the flexible pipe or/and an end region of an intermediate sheath located in an annular space between the pressure sheath and the outer sheath.

A further subject matter of the invention relates to a flexible pipe comprising a central section including at least one polymer sheath and armor elements arranged around or inside the polymer sheath, the flexible pipe comprising at least one end-fitting as defined hereinabove, mounted at one end of the central section.

A further subject matter of the invention is a method for assembling a flexible pipe, including the following steps:
- providing an end region of a polymer sheath of the flexible pipe and end sections of armor elements of the flexible pipe arranged around or in the end region of the polymer sheath;
- fitting an end vault defining a central bore for the letting the fluid flow along a central axis, and a cover defining, along with the end vault, a chamber for receiving the end sections of armor elements;
- mounting at least one sealing assembly comprising at least one crimping ring comprising at least one bulge inserted radially into the polymer sheath;
- placing an annular seal in contact with the polymer sheath away from the crimping ring;
- characterized in that the annular seal includes an annular central region deformable radially toward the polymer sheath, and two stiffened annular peripheral regions located on both sides axially with respect to the central region, the method comprising moving the peripheral annular regions toward each other in order to activate a radial deformation of the central region toward the polymer sheath from a rest configuration to an active sealing configuration around the polymer sheath.

The method according to the invention can comprise one or a plurality of the following feature(s), taken individually or according to any technically possible combination:
- the end-fitting defines a housing for receiving the annular seal, the housing being delimited by a transverse activation surface of the annular seal, located on the end vault or on a part fastened with respect to the end vault, the transverse activation surface extending opposite the first peripheral region, the housing being also delimited by a transverse thrust surface of the annular seal, located opposite the transverse activation surface, on an additional compression activation part of the annular seal, extending opposite the second peripheral region, the movement of the peripheral annular regions toward each other comprising the relative movement of the activation transverse surface and the thrust 20 transverse surface relative to each other, so as to switch the annular seal from the rest configuration to the active configuration thereof;
- the method comprises the transmission of external pressure to the flexible pipe up to a gap between the activation transverse surface and the first peripheral region, so as to bring the first peripheral region closer to the second peripheral region.

DESCRIPTION OF THE DRAWINGS

The invention will be better understood upon reading the following description, given only as an example and making reference to the enclosed drawings, wherein.

DETAILED DESCRIPTION

Hereinafter, the terms "outer" and "inner" generally refer to a radial direction to an axis A-A' of the pipe, the term "outer" meaning relatively further radially from the axis A-A' and the term "inner" meaning relatively closer radially to the axis A-A' of the pipe.

The terms "front" and "rear" refer to an axial direction with respect to an axis A-A' of the pipe, the term "front" meaning relatively further from the middle of the pipe and closer to one end of the pipe, the term "rear" meaning relatively closer to the middle of the pipe and farther from one end of the pipe. The middle of the pipe is the point of the pipe which is equidistant from both ends of the pipe.

Figure 1:
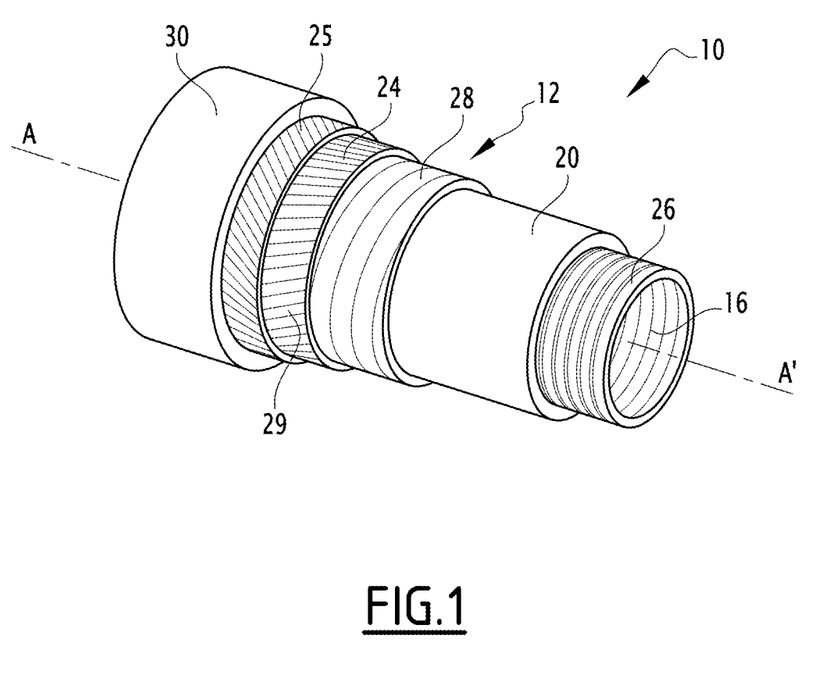
FIG. 1 is a partially exploded perspective view of a first flexible pipe according to the invention.
Figure 2:
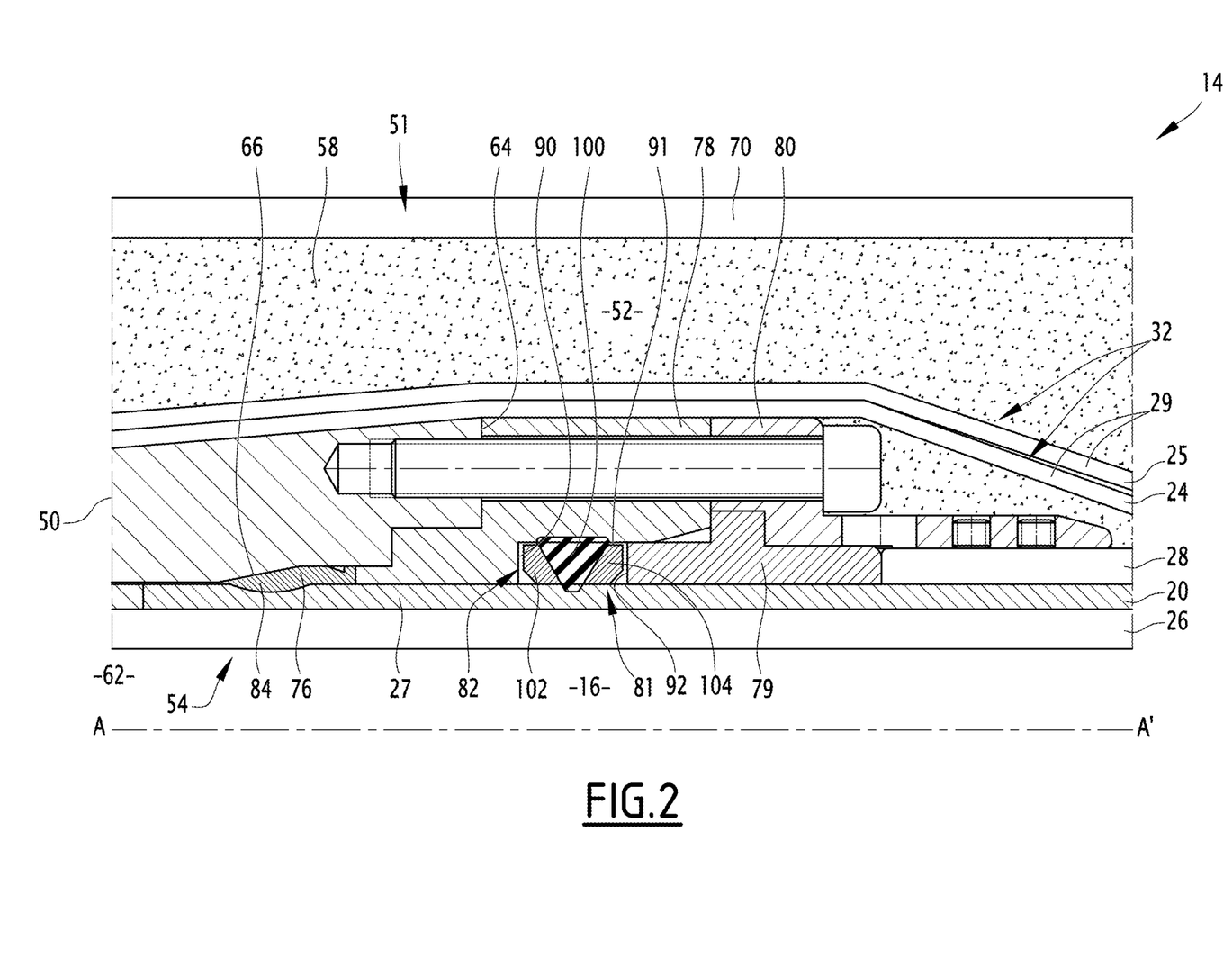
FIG. 2 is a sectional view along a median axial plane of the relevant parts of the end-fitting of the flexible pipe shown in FIG. 1 illustrating an annular seal applied to the pressure sheath.
Figure 3:
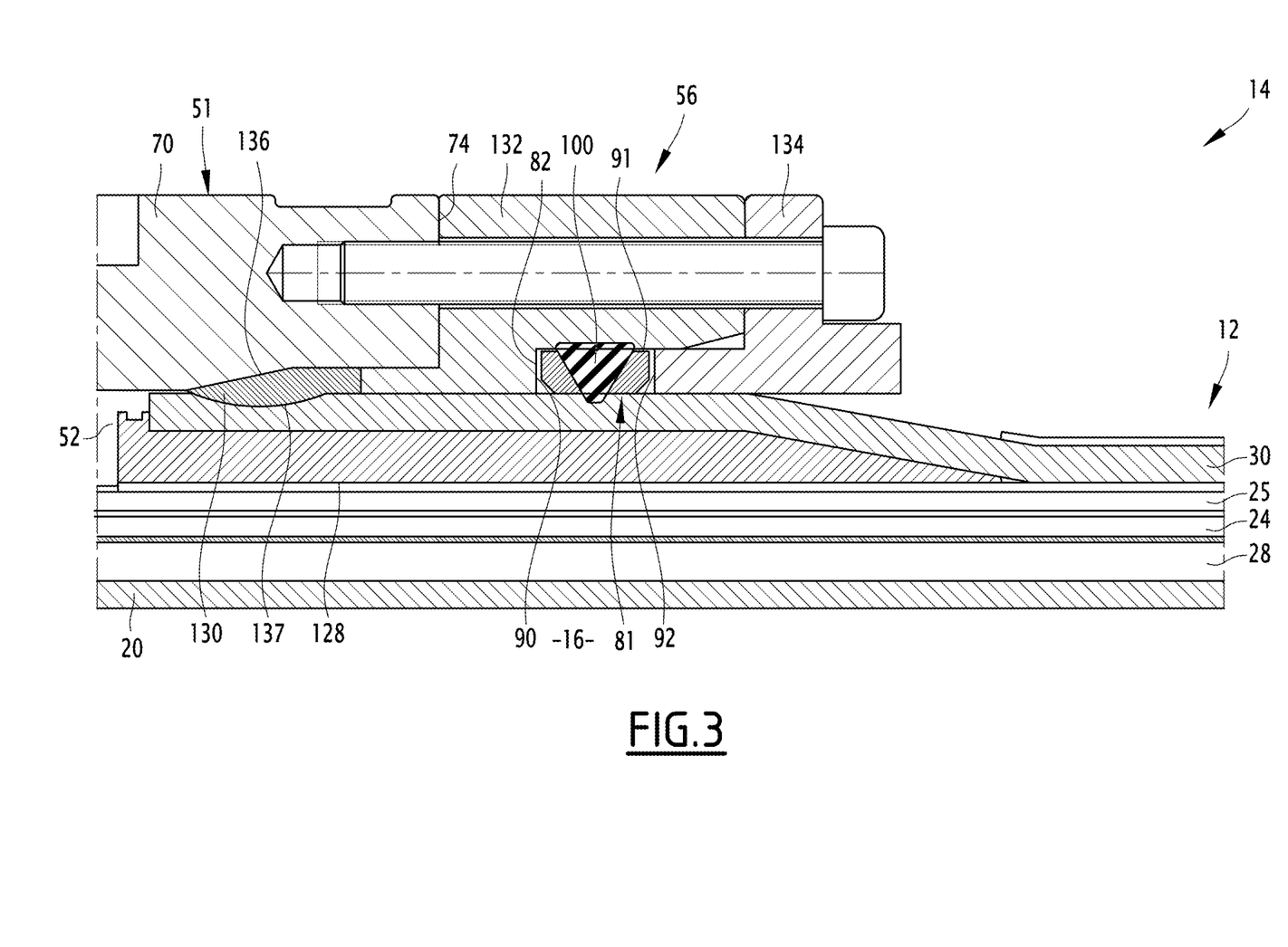
FIG. 3 is a view similar to FIG. 2, in the case of an annular seal applied to an outer sheath.

A flexible pipe 10 according to the invention is partially illustrated in FIGS. 1 to 3. The flexible pipe 10 includes a central section 12 illustrated, in part, in FIG. 1. The pipe includes, at each of the axial ends of the central section 12, an end end-fitting 14 (not visible in FIG. 1), the relevant parts of which are shown in FIGS. 2 and 3.

With reference to FIG. 1, the pipe 10 delimits a central passage 16 for letting a fluid flow, advantageously a petroleum fluid. The central passage 16 extends along a central axis A-A', between the upstream end and the downstream end of the pipe 10. It emerges through the end-fittings 14.

The flexible pipe 10 is intended for being arranged through a body of water (not shown) in an installation for extracting fluids, in particular hydrocarbons.

The body of water is e.g. a sea, a lake or a river. The depth of the body of water at the installation for using fluids is comprised e.g. between 500 m and 3000 m.

The installation for using fluids includes a surface unit and a bottom unit (not shown) which are generally connected to each other by the flexible pipe 10.

The flexible pipe 10 is preferentially an "unbonded" pipe.

At least two adjacent layers of the flexible pipe 10 are free to move longitudinally with respect to each other during a bending of the pipe. Advantageously, all the layers of the flexible pipe are free to move with respect to each other. Such a pipe is described e.g. in the normative documents published by the American Petroleum Institute (API), API 17J, 4th edition—May 2014 and API RP 17B, 5th edition—May 2014.

As illustrated in FIG. 1, the pipe 10 delimits a plurality of concentric layers about the axis A-A', which extend continuously along the central section 12 as far as the end-fittings 14 situated at the ends of the pipe.

According to the invention, the pipe 10 includes at least one first polymer sheath advantageously forming a pressure sheath 20.

The pipe 10 further includes tensile armor layers 24, 25 arranged externally with respect to the pressure sheath 20.

Advantageously, and depending on the desired use, the pipe 10 further includes an inner carcass 26 arranged inside the pressure sheath 20, a pressure vault 28 interposed between the pressure sheath 20, if appropriate a hoop, the layer or layers of tensile armor 24, 25 and an outer sheath 30, intended to protect the pipe 10.

In a known manner, the tubular sheath 20 is intended to confine, in a leak-tight way, the transported fluid transported, in the passage 16. It is made of a polymer material, e.g. containing a polyolefin such as polyethylene, containing a polyamide such as PA11 or PA12, or containing a fluoropolymer such as polyvinylidene fluoride (PVDF).

In a variant, the tubular sheath 20 is made of a high-performance polymer such as PEK (polyether ketone), PEEK (polyether ether ketone), PEEKK (polyether ether ketone), PEKK (polyether ketone ketone), PEKEKK (polyether ketone ether ketone ketone), PAI (polyamide-imide), PEI (polyether-imide), PSU (polysulfone), PPSU (polyphenylsulfone), PES (polyethersulfone), PAS (polyarylsulfone), PPE (polyphenylene ether), PPS (polyphenylene sulfide), LCP (liquid crystal polymers), PPA (polyphthalamide) and/or mixtures thereof or further a mixture with PTFE (polytetrafluoroethylene) or PFPE (perfluoropolyether).

The thickness of the pressure sheath 20 is comprised e.g. between 5 mm and 20 mm.

As can be seen in FIG. 2, the pressure sheath 20 has an end region 27 arranged in the end-fitting 14.

The carcass 26, when present, is formed e.g. by a profiled metal strip, wound in a spiral. The turns of the strip are advantageously interlocked, which serves to take up the radial crushing forces.

In the present example, the carcass 26 is arranged inside the pressure sheath 20. The flexible pipe 10 is then referred to by the term "rough bore" because of the geometry of the carcass 26.

In a variant (not shown), the flexible pipe 10 does not have an inner carcass 26 and is then referred to by the term "smooth bore".

The helical winding of the profiled metal strip forming the carcass 26 has a short pitch, i.e. has a helix angle about the axis A-A' of the pipe of an absolute value close to 90°, typically comprised between 75° and 90°.

In the present example, the pressure vault 28 is intended to take up the radial forces associated with the pressure inside the pressure sheath 20. The pressure vault is formed e.g. of a profiled metal wire wound helically around the sheath 20. The profiled wire generally has a complex geometry, in particular in the shape of a Z, a T, a U, a K, an X or an I, which is used to staple the turns of the pressure vault 28 between each other. The stapling of the turns of the pressure vault 28 serves to control the spacings between adjacent turns in order, in particular, to prevent the pressure sheath 20 from creeping through the pressure vault 28 under the effect of the pressure inside the pipe 10.

The pressure vault 28 is wound in a short-pitch helix around the pressure sheath 20, i.e. with a helix angle about the axis A-A' of the pipe of an absolute value close to 90°, typically comprised between 75° and 90°.

If appropriate, a hoop (not shown in FIG. 1) surrounds the pressure vault 28. The hoop is also intended to take up the radial forces associated with the pressure, in addition to the pressure vault 28. The hoop is formed e.g. of a metal wire of substantially rectangular cross-section wound in a short-pitch helix around the pressure vault sheath 28. The turns of the hoop are not stapled together.

The flexible pipe 10 according to the invention comprises at least one armor layer 24, 25 formed by a helical winding of at least one elongated armor element 29.

In the example shown in FIG. 1, the flexible pipe 10 includes a plurality of armor layers 24, 25, in particular a first inner armor layer 24, applied to the pressure vault 28 (or to the sheath 20 when the vault 28 is absent) and a second outer armor layer 25 around which the outer sheath 30 is arranged.

Each armor layer 24, 25 includes longitudinal armor elements 29 wound with a large pitch about the axis A-A' of the pipe.

"Wound with a large pitch" means that the absolute value of the helix angle is less than 60° and is typically comprised between 25° and 55°.

The armor elements 29 of a first layer 24 are wound generally following an opposite angle with respect to the armor elements 29 of a second layer 25. Thereby, if the angle of winding of the armor elements 29 of the first layer 24 is equal to +α, α being comprised between 25° and 55°, the angle of winding of the armor elements 29 of the second armor layer 25 arranged in contact with the first layer 24 is e.g. −α, with α comprised between 25° and 55°.

The armor elements 29 are e.g. formed by metal wires, or by composite tapes, in particular composite tapes reinforced with carbon fibers.

As can be seen in FIG. 2, the armor elements 29 each have an end portion 32 inserted into the end-fitting 14. The end portion 32 extends as far as a free end arranged in the end-fitting 14. It advantageously has a helical or pseudo-helical trajectory of axis A-A' in the end-fitting 14.

The flexible pipe 10 advantageously includes anti-wear layers interposed between the pressure vault 28 and the first inner armor layer 24, and between the two armor layers 24, 25.

Each anti-wear layer is formed by helically winding a polymeric strip with a thickness typically comprised between 2 mm and 4 mm. Each anti-wear layer has the function of reducing the friction between the metal wires or the wear between the composite tapes between which the layer is inserted.

The outer sheath 30 is intended for forming a barrier sealed against liquids, from the outside of the flexible pipe towards the inside. It is advantageously made of a polymer material, in particular containing a polyolefin, such as polyethylene, containing a polyamide, such as PA11 or PA12, or containing a fluoropolymer such as polyvinylidene fluoride (PVDF).

In a variant, the tubular sheath 30 is made of a high-performance polymer such as PEK (polyether ketone), PEEK (polyether ether ketone), PEEKK (polyether ether ketone), PEKK (polyether ether ketone ketone), PEKEKK (polyether ketone ether ketone ketone), PAI (polyamide-imide), PEI (polyether-imide), PSU (polysulfone), PPSU (polyphenylsulfone), PES (polyethersulfone), PAS (polyarylsulfone), PPE (polyphenylene ether), PPS (polyphenylene sulfide), LCP (liquid crystal polymers), PPA (polyphthalamide) and/or mixtures thereof or further a mixture with PTFE (polytetrafluoroethylene) or PFPE (perfluoropolyether).

The width of the outer sheath 30 is comprised e.g. between 5 mm and 15 mm.

As illustrated in FIG. 2, each end-fitting 14 includes, in addition to the end region 27 of the pressure sheath 20 and the end sections 32 of the armor elements 29, an end vault 50 and an outer connection cover 51 protruding axially rearwards from the end vault 50. The cover 51 delimits, along with the end vault 50, a chamber 52 for receiving the end sections 32 of the armor elements 29.

The end-fitting 14 further includes a front sealing assembly 54 around the pressure sheath 20, and a rear sealing assembly 56 around the outer sheath 30 (visible only in FIG. 3 which will be described hereinbelow).

In the present example, the end-fitting 14 further includes a solid filling material 58, such as a thermosetting polymer resin such as an epoxy or an araldite. The solid filling material is arranged inside the chamber 52 around the end sections 32.

In the present example, the end vault 50 is intended to connect the pipe 10 to another connection end-fitting 14 or to end equipment, advantageously by means of an end flange (not shown).

The end vault 50 has a central bore 62 intended to receive the end region 27 of the pressure sheath 20 and to allow the fluid circulating through the central passage 16 to flow to the outside of the pipe 10.

In the example shown in FIG. 2, the end vault 50 defines internally a rear face 64 delimiting a convergent bearing surface 66 for a crimping ring.

The cover 51 includes a tubular peripheral wall 70 extending around the axis A-A'. The peripheral wall 70 has a front edge (not visible) fastened to the end vault 50, radially spaced from the armor layers 24, 25 and a rear edge 74 (visible only in FIG. 3) extending axially rearward beyond the end vault 50.

The cover 51 delimits the chamber 52 radially outwards.

The front sealing assembly 54 is advantageously located at the front of the end-fitting 14, in contact with the end vault 50, and is offset axially forwards with respect to the rear sealing assembly 56.

It comprises a front crimping ring 76, intended to engage with the pressure sheath 20, and a front clamping flange 78 for clamping the front crimping ring 76.

In the example shown in FIG. 2, wherein the pipe 10 includes a pressure vault 28, the front sealing assembly 54 further includes a flange 80 for stopping the pressure vault 28, and advantageously includes a spacer 79.

According to the invention, the front sealing assembly 54 further comprises an annular seal 81 which can be activated, arranged so as to bear onto the pressure sheath 20, the annular seal 81 being received in an annular housing 82 of the end-fitting 14.

The front clamping flange 78 is configured to be screwed onto the rear face 64 of the end vault 50.

The front crimping ring 76 is configured to be moved forwards along the axis A-A' by sliding on the convergent surface 66, being thrust forwards by the front clamping flange 78, during the mounting thereof on the end vault 50. The front crimping ring 76 includes a front bulge 84 configured to be thrust radially into the pressure sheath 20 by a wedge effect during the movement of the front crimping ring 76 on the convergent surface 66.

Figure 5:
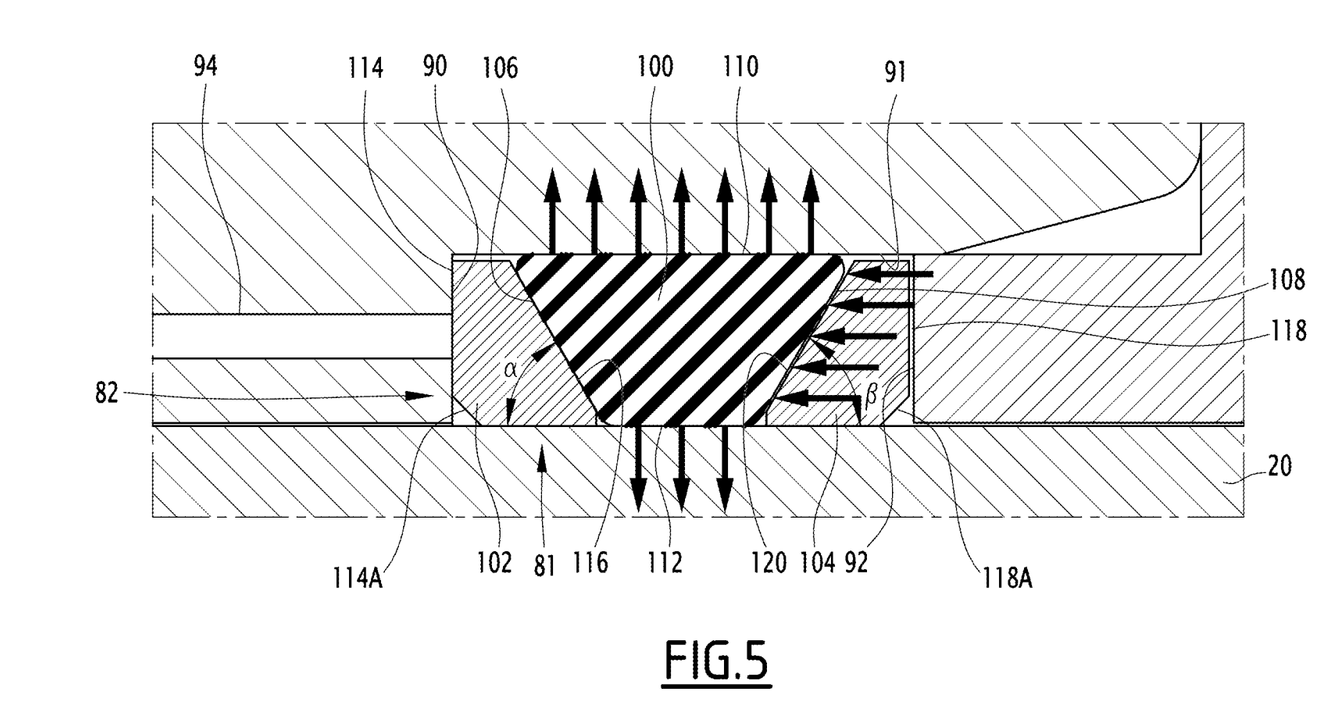
FIG. 5 illustrates the principle of operation of the annular seal shown in FIGS. 2 to 4.

As can be seen in FIGS. 2 and 5, the housing 82 is defined at the front by an annular shoulder formed in the flange 78, facing the end region 27 of the pressure sheath 20 arranged in the end-fitting. The shoulder defines a transverse surface 90 for activating the annular seal 81, arranged in front of the annular seal 81, and an inner circumferential face 91 extending around and facing the sheath 20.

The housing 82 is closed toward the rear by a transverse thrust surface 92 defined at the front of the spacer 79. Thereby, the transverse thrust surface 92 is configured to be brought closer to the transverse activation surface 90 in order to compress the annular seal 81. The spacer 79 forms herein an additional part for activating the compression of the annular seal 81, directly mounted onto the end vault 50.

With reference to FIG. 5, the end vault 50 and the front flange 78 advantageously define at least one pressure transmission channel 94 external to the flexible pipe 10 toward the housing 82.

The channel 94 opens out, on the one hand, through the transverse activation surface 90, and, on the other hand, into the chamber 52. Thereby, the external pressure which is applied, if appropriate, in the chamber 52, is configured to be transmitted to the intermediate space situated between the transverse activation surface 90 and the annular seal 81 through the channel 94.

As illustrated in FIGS. 2 and 5, the annular seal 81 which can be activated, includes a deformable central region 100, intended to be inserted in a sealed way between the sheath 20 and the inner face 91 delimiting the housing 82, a first stiffened front peripheral region 102, arranged on a first side of the central region 100 and a second stiffened rear peripheral region 104 arranged on another side of the central region 100. The first peripheral region 102 and the second peripheral region 104 are movable toward each other to compress the central region 100 and cause the radial expansion of the central region 100 toward the sheath 20.

The central region 100 is preferentially formed of a deformable material, such as an elastomer. The elastomer is e.g. a fluoroelastomer, such as fluorocarbon (FKM) manufactured with vinylidene fluoride (VDF or VF2) chosen e.g. amongst a hexafluoropolypylene (HFP) and VF2 copolymer, a tetrafluoroethylene (or "TFE"), HFP, and VF2 terpolymer, a TFE and perfluoromethylvinylether (or "PMVE") and VF2 terpolymer, a TFE, propylene and VF2 terpolymer or a TFE, HFP, ethylene, PMVE and VF2 pentapolymer.

In a variant, the fluoroelastomer is a perfluoroelastomer (FFKM), e.g. a terpolymer of TFE, of PMVE and of a third monomer which can be used in crosslinking. In another variant, the fluoroelastomer is a fluorosilicone (FVMQ) or a propylene tetrafluoroethylene (FEPM) copolymer.

In a variant or in addition, the central region 100 is made of a nitrile rubber, more particularly an acrylonitrile butadiene copolymer (NBR) and/or a hydrogenated acrylonitrile butadiene copolymer (HNBR).

In the present example, the central region 100 has a trapezoidal cross-section tapering from the outside toward the inside between the inner face 91 of the housing 82 and the pressure sheath 20, the cross-section being taken in each median axial plane passing through the axis A-A'.

With reference to FIG. 5, the central region 100 comprises a first inclined front surface 106, a second inclined rear surface 108, and an outer circumferential surface 110 connecting the first inclined surfaces 106 and 108.

It further includes an inner tip 112 intended to be applied on the sheath 20.

The first surface 106 is inclined backwards, moving from the front to the rear. It converges toward the inner tip 112. The second inclined surface 108 is inclined forwards by moving from the rear to the front. It also converges toward the tip 112.

Thereby, the width of the central region 100 taken along the axis A-A' at the inner tip 112 is less than the width of the central region 100 taken along the axis A-A' at the outer circumferential surface 110.

Preferentially, the hardness of the material forming the central region 100 is less than 100 Shore A, in particular between 60 Shore A and 90 Shore A.

The central region 100 is thereby more deformable than the peripheral regions 102, 104, allowing the radial expansion thereof toward the sheath 20 and the compression thereof on the sheath 20.

The first front peripheral region 102 has a wedge-shaped section taken in each median axial plane passing through the axis A-A'. It thereby has a first front lateral surface 114, perpendicular to the axis A-A', intended to extend opposite the transverse activation surface 90 and a first supplementary inclined surface 116, situated at the rear, applied to the first front inclined surface 106 of the central region 100.

The angle α of inclination of the first inclined front surface 106 and of the first supplementary inclined surface 116 is comprised e.g. between 40° and 80° with respect to the axis A-A'.

The first front lateral surface 114 is advantageously continued toward the sheath 20 by a front chamfer 114A situated opposite the sheath 20.

The second peripheral region 104 has a second rear lateral surface 118, perpendicular to the axis A-A', intended to extend opposite the transverse thrust surface 92, and a second supplementary inclined surface 120, situated at the front, applied against the second rear inclined surface 108 of the central region 100.

The angle β of inclination of the second rear inclined surface 108 and of the second supplementary inclined surface 116 with respect to the axis A-A' is comprised e.g. between 40° and 80°. The angle β is preferentially equal to the angle α.

The second rear lateral surface 118 is advantageously continued toward the sheath 20 by a rear chamfer 118A situated opposite the sheath 20.

The first front peripheral region 102 and the second rear peripheral region 104 are each formed of a material that is stiffer than the central region, e.g. a thermoplastic polymer.

It is made e.g. of PEK (polyetherketone), PEEK (polyetheretherketone), PEEKK (polyetheretherketone ketone), PEKK (polyetherketone ketone), PEKEKK (polyetherketone ether ketone ketone), or of a fluoropolymer, such as polyethylene tetrafluoride (PTFE).

Preferentially, the hardness of the material forming each peripheral region 102, 104 is greater than the hardness of the central region 100. The hardness is e.g. greater than 65 shore D.

The peripheral region 102, 104 is e.g. made of PTFE or of PEEK.

Thereby, under the effect of a rearward thrust force applied to the first peripheral region 102 at the first front lateral surface 114 and/or a forward thrust force applied to the second peripheral region 104 at the second lateral surface 118, the first peripheral region 102 and the second peripheral region 104 are configured to approach each other to compress the central region 100 between the supplementary inclined surfaces 116, 120. The above causes the radial expansion of the inner tip 112 toward the sheath 20, and the application of the circumferential surface 110 on the inner face 91 of the housing 82.

The annular seal 81 thereby switches from a rest configuration to a first active sealing configuration, in compression, wherein said seal forms a sealing between the sheath 20 and the front clamping flange 78 during the assembly of the end-fitting 14.

Such sealing is reinforced when the pressure increases in the annulus between the outer sheath 30 and the pressure sheath 20, tending to thrust the second peripheral region 104 toward the first peripheral region 102.

In a known way, as illustrated in FIG. 3, the rear sealing assembly 56 includes a rear crimping ring 130, a rear clamping flange 132 for clamping the rear crimping ring 130, and a rear compression flange 134.

The rear sealing assembly 56 advantageously includes an intermediate support sleeve 128 interposed between the outer sheath 30 and the armor layers 24, 25, the outer sheath 30 resting on the intermediate sleeve 128.

Advantageously, in the embodiment shown in FIG. 3, the rear sealing assembly 56 further includes an external annular seal 81 which can be activated, arranged in an outer housing 82.

The rear crimping ring 130 is interposed between a rear inclined surface 136 of the cover 51 and the outer sheath 30. It has a front bulge 137 configured to be radially thrust into the outer sheath 30 by a wedging effect during the movement of the rear crimping ring 130 on the surface 136.

The rear clamping flange 132 is fastened on the rear edge 74 of the cover 51. It thrusts forward the rear crimping ring 130 to move the ring radially toward the axis A-A' and crimp the outer sheath 30.

The outer sheath 30 bears on the intermediate sleeve 128. It is axially wedged to the rear of the fastening assembly 56.

The outer housing 82 of the rear sealing assembly 56 has a similar structure to the housing 82 defined for the front sealing assembly 54.

It is defined by an annular shoulder formed in the rear clamping flange 132, facing an end region of the outer sheath 30 arranged in the end-fitting 14. As hereinabove, the shoulder defines a first transverse surface 90 for activating the annular seal 81, arranged in front of the annular seal 81 and an inner circumferential face 91 extending around and facing the sheath 30.

The housing 82 is closed toward the rear by a transverse thrust surface 92 defined at the front of the rear compression flange 134. Thereby, the transverse thrust surface 92 is configured to be brought closer to the transverse activation surface 90 in order to compress the annular seal 81 as described hereinabove. The rear compression flange 134 thereby forms an additional part for activating the compression of the annular seal 81, directly mounted onto the cover 51.

The annular seal 81 of the rear seal assembly 56 has an identical structure to the annular seal 81 of the front seal assembly 54.

The assembly of the end-fitting 14 will now be described.

Initially, the end vault 50 is fitted around the end region 27 of the pressure sheath 20, the armor layers 24, 25 having been moved radially outwards.

The crimping ring 76 is fitted between the pressure sheath 20 and the convergent surface 66 of the end vault 50.

The clamping flange 78 is then fitted to be clamped against the rear face 64 of the end vault 50. Then, the annular seal 81 which can be activated in the rest configuration thereof, is fitted in the housing 82. The housing 82 is then closed by inserting the spacer 79.

The clamping flange 78 and the spacer 79 are then clamped against the end vault 50, making the transverse thrust surface 92 move toward the transverse activation surface 90, and the central region 100 of the joint which can be activated, compress between the peripheral regions 102, 104. As a result, the inner tip 112 is applied and compressed against the sheath 20.

Similarly, the sleeve 128 is inserted between the armor elements 24, 25 and the outer sheath 30.

The cover 51 is fitted around the pipe 10 so as to form, with the end vault 50, the chamber 52. The rear crimping ring 130 is then fitted between the cover 51 and the outer sheath 30. The rear clamping flange 132 is then fitted so as to delimit the outer housing 82, then the annular seal 81 is inserted into the outer housing 82.

The compression flange 134 is then assembled at the rear of the clamping flange 132. The rear clamping flange 132 is then clamped against the rear edge 74 of the cover 51. The compression flange 134 moves closer to the rear clamping flange 132, causing the compression of the central region 100 of the outer annular seal 81 between the first peripheral region 102 and the second peripheral region 104, and the application of the inner end-fitting 112 against the outer sheath 30.

Advantageously, during assembly, the sealing provided by the annular seal 81 can be tested by inserting a pressure through the channel 94, following an adaptation of the method described in U.S. Pat. No. 6,923,477, in order to ensure that, in the event of a failure of the sealing between the front crimping ring 76 and the pressure sheath 20, the annular seal 81 is configured to provide the sealing between the end vault 50 and the pressure sheath 20.

In use, in the event of a possible overpressure on the outside of the flexible pipe 10 with respect to the inside of the flexible pipe 10, the annular seal 81 maintains the sealing around the pressure sheath 20 even if the integrity of the crimping front ring 76 with respect to the end region 27 of the pressure sheath 20 fails. The sealing is even reinforced, since the excess pressure transmitted to the annular seal 81 through the channel 94 causes an additional compression of the central region 100 beyond the primary compression resulting from the fitting of the annular seal 81.

Figure 4:
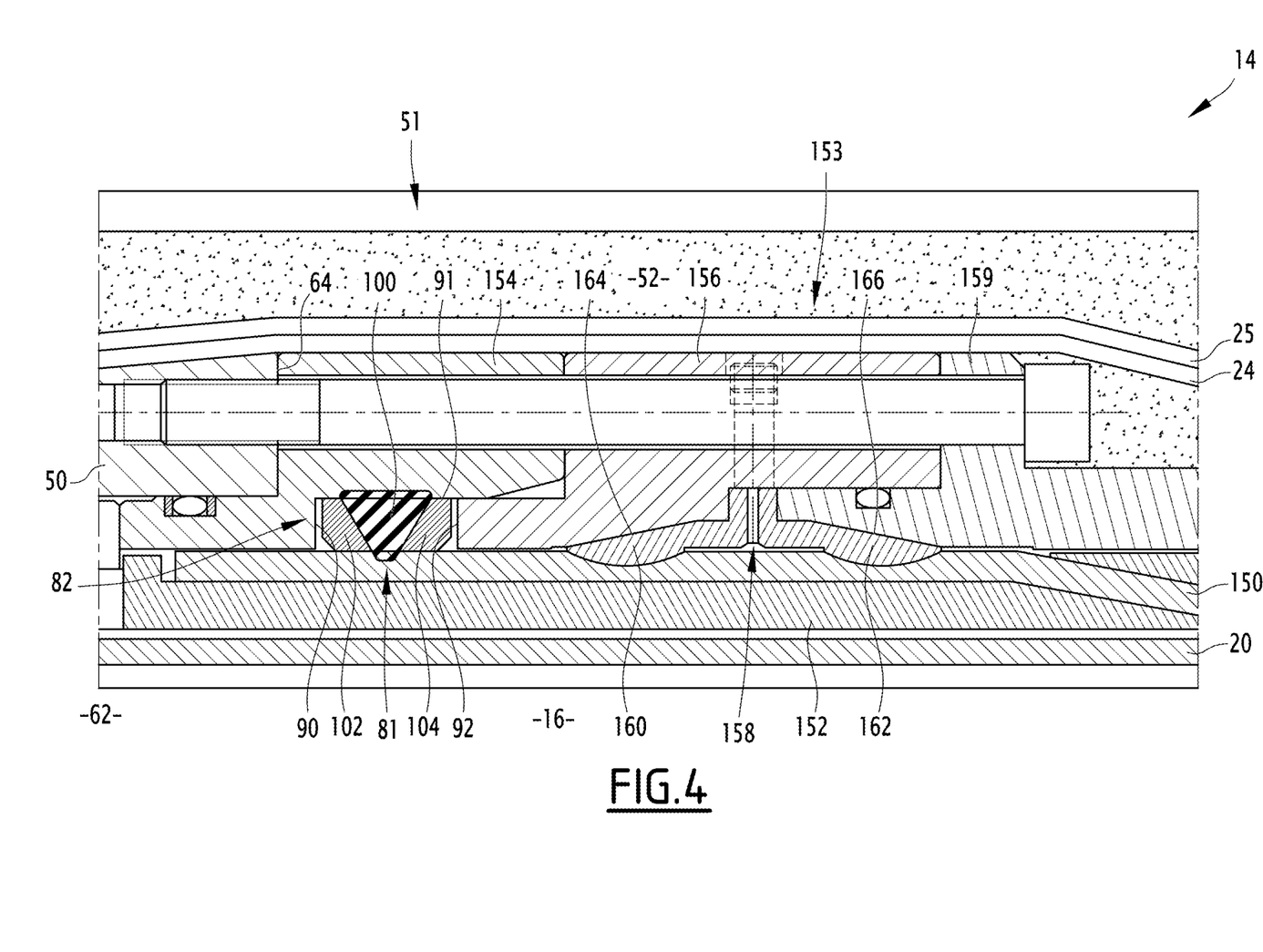
FIG. 4 is a view similar to FIG. 2, in the case of an annular seal applied to an intermediate sheath.

In the variant shown in FIG. 4, the flexible pipe 10 further comprises an intermediate sheath 150 arranged in the annulus between the pressure sheath 20 and the outer sheath 30. The end-fitting further comprises an intermediate sleeve 152 on which the intermediate sheath 150 rests.

The intermediate sleeve 152 is advantageously provided with an internal passage for gas circulation.

The end-fitting 14 comprises an intermediate sealing assembly 153 comprising a first intermediate housing flange 154 mounted on the end vault 50 at the rear face 64 and a second intermediate compression flange 156 mounted on the first intermediate flange 154. The intermediate sealing assembly 153 further comprises an intermediate ring 158 for crimping the intermediate sheath 150 and a clamping flange 159 mounted at the rear of the flanges 154, 156.

Advantageously, in the embodiment shown in FIG. 4, the intermediate sealing assembly 153 further includes an intermediate annular seal 81 which can be activated, arranged in an intermediate housing 82 formed between the first intermediate flange 154 and the second intermediate flange 156.

The intermediate crimping ring 158 includes two opposite bulges, a front bulge 160 and a rear bulge 162, each intended to be inserted into the intermediate sheath 150.

The intermediate crimping ring 158 is interposed at the front, between a rear inclined surface 164 of the intermediate crimping flange 156 and the intermediate sheath 150, and at the rear, between a front inclined surface 166 of the intermediate clamping flange 159 and the intermediate sheath 150.

The above causes the crimping of the front bulge 160 and of the rear bulge 162 into the intermediate sheath 150.

The intermediate housing flange 154, the intermediate crimping flange 156 and the intermediate clamping flange 159 are pressed against each other and are fastened together to the rear face 64 of the end vault 50.

The intermediate sheath 150 bears on the intermediate sleeve 152.

The intermediate housing 82 of the intermediate sealing assembly 153 has a similar structure to the housing 82 defined for the front sealing assembly 54. It is located at the front of the intermediate crimping ring 158.

The intermediate housing 82 is defined by an annular shoulder formed in the intermediate housing flange 154, facing an end region of the intermediate sheath 150 arranged in the end-fitting 14. As hereinabove, the shoulder defines a first transverse surface 90 for activating the annular seal 81, arranged in front of the annular seal 81 and an inner circumferential face 91 extending around and facing the intermediate sheath 150.

The housing 82 is closed toward the rear by a transverse thrust surface 92 defined at the front of the intermediate compression flange 156. Thereby, the transverse thrust surface 92 is configured to be brought closer to the transverse activation surface 90 in order to compress the annular seal 81, as described hereinabove.

The intermediate compression flange 156 thereby forms an additional part for activating the compression of the annular seal 81, directly mounted on the end vault 50.

The annular seal 81 of the intermediate seal assembly 153 has an identical structure to the annular seal 81 of the front seal assembly 54. It provides an effective seal between the intermediate sheath 150 and the intermediate flanges 154, 156, even if the seal is not maintained by the intermediate crimping ring 158.

In a variant applying to each of the embodiments shown in FIGS. 2 to 4, the first peripheral region 102 and the second peripheral region 104 are each formed by a stiffened ring 180 embedded in the deformable material forming the central region 100. The stiffened ring 180 is e.g. a spring wire, a rod or a rope.

The stiffened ring 180 is e.g. formed of metal, a metal alloy or a material that is stiffer than the central region 100, e.g. a thermoplastic polymer, in particular fibers.

The metal alloy is e.g. phosphor bronze. The fibers are e.g. synthetic polyester fibers.

The stiffer material is e.g. made of PEK (polyetherketone), PEEK (polyetheretherketone), PEEKK (polyetheretherketoneketone), PEKK (polyetherketone), PEKEKK (polyetherketonetherketone ketone), or a fluoropolymer, such as polyethylene tetrafluoride (PTFE). The thermoplastic polymer may be filled with fibers such as carbon fibers.

In a variant, the stiffened ring 180 is made of a combination of metal and thermoplastic polymer, e.g. arranged coaxially. More particularly, the stiffened ring 180 comprises coaxial coil springs, advantageously a spring with an internal coil made of metal, in particular stainless steel, and an external spring made of polymer, in particular PEEK (polyetheretherketone).

Figure 6:
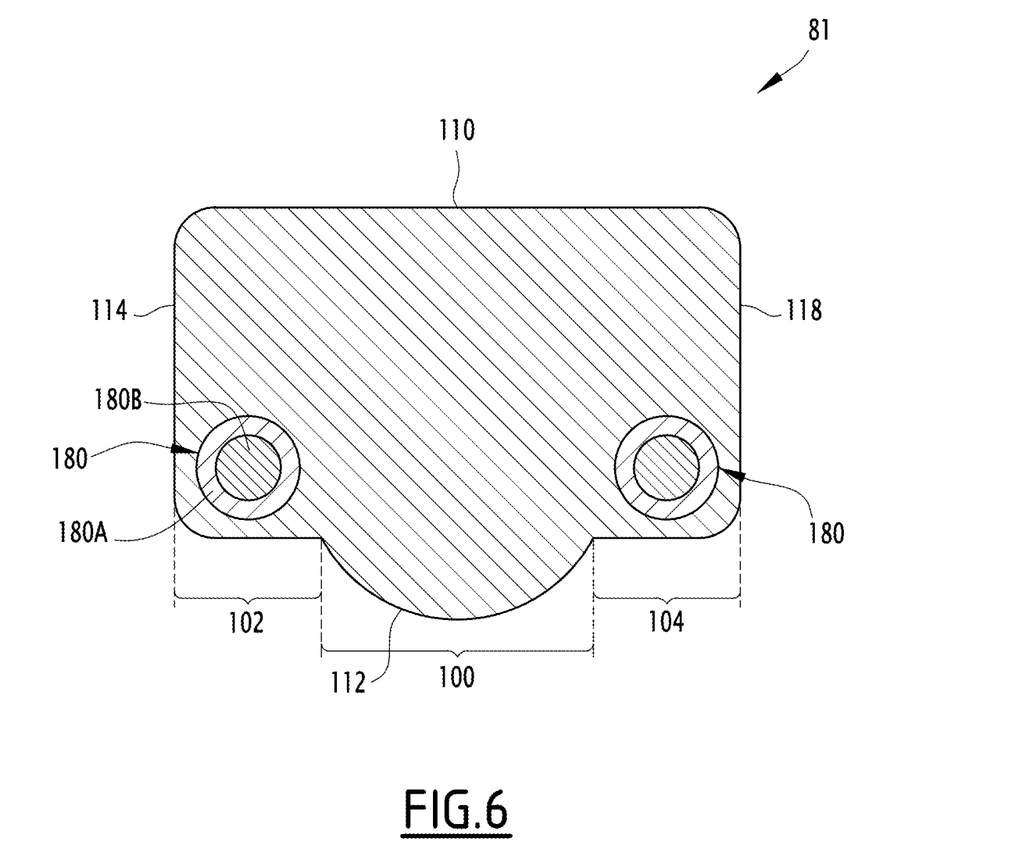
FIG. 6 illustrates a variant of an annular seal that can be used in an end-fitting according to the invention.

In a variant, as illustrated in FIG. 6, the stiffened ring 180 is a combination of a spring wire 180A and a snap ring 180B, the snap ring 180B being arranged inside the spring wire 180A.

In the present example, the stiffened ring 180 is arranged in the vicinity of an inner surface of the annular seal 81 intended to be applied on the sheath 20, 30, 150 on both sides of the end-fitting 112. Herein, at rest, the tip 112 protrudes. The tip has a rounded contour.

Moreover, the operation of the annular seal 81 described in FIG. 6 is analogous to the operation described in FIG. 5.

The invention claimed is:

1. An end-fitting of a flexible pipe for transporting a fluid, comprising:
    at least one end region of a polymer sheath of the flexible pipe;
    end sections of armor elements of the flexible pipe arranged around or in the end region of the polymer sheath;
    an end vault defining a central bore for letting the fluid flow, extending along a central axis;
    a cover defining, along with the end vault, a chamber for receiving the end sections of armor elements;
    at least one sealing assembly comprising at least one crimping ring, the crimping ring comprising at least one bulge radially inserted into the polymer sheath;
    an annular seal, arranged in contact with the polymer sheath away from the crimping ring;
    the annular seal including a central annular region deformable radially toward the polymer sheath, and two stiffened annular peripheral regions, located on either side of the central region along the central axis, the peripheral annular regions being movable toward each other to activate the radial deformation of the central region toward the polymer sheath from a rest configuration to an active sealing configuration around the polymer sheath.

2. The end-fitting according to claim 1, wherein at least in the operative position, the central region defines a radial tip protruding toward the polymer sheath beyond each peripheral annular region.

3. The end-fitting according to claim 2, wherein in the rest configuration, the central region has the radial tip.

4. The end-fitting according to claim 1, wherein the central region (100) is made of elastomer, each peripheral region (102, 104) being made of metal, or of a polymer that is more rigid than the elastomer.

5. The end-fitting according to claim 4, wherein the elastomer is a fluoroelastomer or a nitrile elastomer.

6. The end-fitting according to claim 4, wherein the polymer which is more rigid than the elastomer, contains PEK, PEEK, PEEKK, PEKEKK, or contains a fluoropolymer.

7. The end-fitting according to claim 1, defining a housing for receiving the annular seal, the housing being delimited by a transverse activation surface of the annular seal, located on the end vault or on a part fastened with respect to the end vault, the transverse activation surface extending opposite the first peripheral region, the housing being also delimited by a transverse thrust surface of the annular seal, located opposite the transverse activation surface, on an additional compression activation part of the annular seal, the transverse thrust surface extending opposite the second peripheral region, the transverse activation surface and the transverse thrust surface being movable relative to each other at least during the fitting of the-end-fitting so as to switch the annular seal from the rest configuration of the annular seal to the active configuration of the annular seal.

8. The end-fitting according to claim 7, wherein the additional part is fastened onto the crimping ring.

9. The end-fitting according to claim 7, defining a channel for transmitting an external pressure to the flexible pipe, the channel opening out into the housing between the transverse activation surface and the first peripheral region.

10. The end-fitting according to claim 1, wherein the first peripheral region and/or the second peripheral region are directly mounted on surfaces of the central region.

11. The end-fitting according to claim 10, wherein the central region has a first inclined surface at a non-zero angle with respect to a plane perpendicular to the central axis, the first peripheral region having a first supplementary inclined surface, directly mounted onto the first inclined surface, the inclination of the first inclined surface being directed toward the second peripheral region when moving radially towards the central axis on the first inclined surface.

12. The end-fitting according to claim 11, wherein the central region has a second inclined surface at a non-zero angle with respect to a plane perpendicular to the central axis the second inclined surface being located opposite the first inclined surface along the central axis, the second peripheral region having a supplementary second inclined surface fastened to the second inclined surface.

13. The end-fitting according to claim 12, wherein the central region has a trapezoidal section.

14. The end-fitting according to claim 1, wherein the first peripheral region and the second peripheral region each have a continuous or discontinuous annular member embedded in the material forming the central region.

15. The end-fitting according to claim 1, wherein the end region of the sheath is an end region of a pressure sheath of the flexible pipe defining an internal passage for letting flow a fluid, an end region of an outer sheath of the flexible pipe defining an outer surface of the flexible pipe and/or an end region of an intermediate sheath located in an annular space between the pressure sheath and the outer sheath.

16. A flexible pipe, comprising a central section including a polymer sheath and armor elements arranged around or inside the polymer sheath, the flexible pipe comprising at least one end-fitting mounted at one end of the central section, the at least one end fitting including:
at least one end region of the polymer sheath;
end sections of the armor elements arranged around or in the end region of the polymer sheath;
an end vault defining a central bore for letting the fluid flow, extending along a central axis;
a cover defining, along with the end vault, a chamber for receiving the end sections of armor elements;
at least one sealing assembly comprising at least one crimping ring, the crimping ring comprising at least one bulge radially inserted into the polymer sheath;
an annular seal, arranged in contact with the polymer sheath away from the crimping ring;
the annular seal including a central annular region deformable radially toward the polymer sheath, and two stiffened annular peripheral regions, located on either side of the central region along the central axis, the peripheral annular regions being movable toward each other to activate the radial deformation of the central region toward the polymer sheath from a rest configuration to an active sealing configuration around the polymer sheath.

17. A method of assembly of an end-fitting of a flexible pipe, comprising:
providing an end region of a polymer sheath of the flexible pipe and end sections of armor elements of the flexible pipe arranged around or in the end region of the polymer sheath;
fitting an end vault defining a central bore for the letting the fluid flow along a central axis, and a cover defining, along with the end vault, a chamber for receiving the end sections of armor elements;
assembling at least one sealing assembly comprising at least one crimping ring, the crimping ring comprising at least one bulge inserted radially into the polymer sheath;
placing an annular seal in contact with the polymer sheath away from the crimping ring; the annular seal including a central annular region deformable radially toward the polymer sheath, and two stiffened annular peripheral regions located axially on opposite sides of the central region, the method comprising moving the peripheral annular regions toward each other to activate a radial deformation of the central region toward the polymer sheath from a rest configuration to an active sealing configuration around the polymer sheath.

18. The method according to claim 17, wherein the end-fitting defines a housing for receiving the annular seal, the housing being delimited by a transverse activation surface of the annular seal, located on the end vault or on a part fastened with respect to the end vault, the transverse activation surface extending opposite the first peripheral region, the housing being also delimited by a transverse thrust surface of the annular seal, located opposite the transverse activation surface, on an additional compression activation part of the annular seal, extending opposite the second peripheral region, the movement of the peripheral annular regions toward each other comprising the relative movement of the activation transverse surface and the thrust transverse surface relative to each other, so as to switch the annular seal from the rest configuration to the active configuration of the annular seal.

19. The method according to claim 18, comprising the transmission of an external pressure to the flexible pipe as far as a gap between the activation transverse surface and the first peripheral region to bring even closer the first peripheral region to the second peripheral region.

* * * * *